US010479063B2

(12) United States Patent
Trpkovski

(10) Patent No.: US 10,479,063 B2
(45) Date of Patent: Nov. 19, 2019

(54) ROLLER MASKING SYSTEM AND METHOD

(71) Applicant: PDS IG Holding LLC, Prairie Du Sac, WI (US)

(72) Inventor: Paul Trpkovski, Green Cove Springs, FL (US)

(73) Assignee: PDS IG Holding LLC, Prairie Du Sac, WI (US)

( * ) Notice: Subject to any disclaimer, the term of this patent is extended or adjusted under 35 U.S.C. 154(b) by 770 days.

(21) Appl. No.: 14/973,291

(22) Filed: Dec. 17, 2015

(65) Prior Publication Data

US 2016/0176171 A1     Jun. 23, 2016

Related U.S. Application Data

(60) Provisional application No. 62/094,354, filed on Dec. 19, 2014.

(51) Int. Cl.
| | |
|---|---|
| *B32B 37/00* | (2006.01) |
| *B29C 63/00* | (2006.01) |
| *B32B 38/00* | (2006.01) |
| *C03C 17/00* | (2006.01) |
| *B29C 63/02* | (2006.01) |
| *B29L 31/00* | (2006.01) |

(52) U.S. Cl.
CPC ........ *B32B 37/025* (2013.01); *B29C 63/0056* (2013.01); *B29C 63/024* (2013.01); *B32B 38/0004* (2013.01); *C03C 17/002* (2013.01); *B29L 2031/7782* (2013.01); *C03C 2218/118* (2013.01); *C03C 2218/355* (2013.01)

(58) Field of Classification Search
CPC ....... B32B 37/00; B32B 37/02; B32B 37/025; B32B 38/00; B32B 38/0004; B29C 63/00; B29C 63/005; B29C 63/0056; B29C 63/02; B29C 63/024; C03C 17/00; C03C 17/002
See application file for complete search history.

(56) References Cited

U.S. PATENT DOCUMENTS

| | | |
|---|---|---|
| 1,996,191 A | 4/1935 | Cook |
| 4,039,370 A | 8/1977 | Kleinknecht |
| | (Continued) | |

FOREIGN PATENT DOCUMENTS

| | | |
|---|---|---|
| DE | 10260587 | 7/2004 |
| FR | 2465693 | 3/1981 |
| | (Continued) | |

OTHER PUBLICATIONS

"International Search Report and Written Opinion," for PCT Application No. PCT/US2015/066765, dated Jun. 22, 2016 (19 pages).

(Continued)

*Primary Examiner* — Jacob T Minskey
*Assistant Examiner* — Matthew Hoover
(74) *Attorney, Agent, or Firm* — Pauly, DeVries Smith & Deffner LLC

(57) ABSTRACT

Embodiments include a system and method for applying a masking material to a glass unit. In an embodiment, the method can include applying a masking material to a roller, cutting the masking material on the roller, and transferring the masking material from the roller to a glass unit. Other embodiments are also included herein.

12 Claims, 12 Drawing Sheets

(56) References Cited

U.S. PATENT DOCUMENTS

| | | | |
|---|---|---|---|
| 5,866,260 A * | 2/1999 | Adams, Jr. | B26D 11/00 |
| | | | 428/426 |
| 6,973,759 B2 | 12/2005 | Trpkovski | |
| 7,025,850 B2 | 4/2006 | Trpkovski | |
| 7,083,699 B2 | 8/2006 | Trpkovski | |
| 7,165,591 B2 | 1/2007 | Trpkovski | |
| 7,691,220 B2 | 4/2010 | Jean-Pierre et al. | |
| 8,652,576 B2 | 2/2014 | Gonzalez et al. | |
| 10,246,936 B2 | 4/2019 | Trpkovski | |
| 2003/0012981 A1 | 1/2003 | Yamada et al. | |
| 2003/0041532 A1 | 3/2003 | Trpkovski et al. | |
| 2003/0041533 A1 | 3/2003 | Trpkovski et al. | |
| 2003/0041534 A1 | 3/2003 | Trpkovski et al. | |
| 2003/0047538 A1 | 3/2003 | Trpkovski et al. | |
| 2003/0056905 A1* | 3/2003 | Kuhn | B65H 35/0013 |
| | | | 156/523 |
| 2003/0087592 A1 | 5/2003 | Trpkovski et al. | |
| 2003/0121218 A1 | 7/2003 | Spindler et al. | |
| 2003/0213187 A1 | 11/2003 | Trpkovski et al. | |
| 2004/0031215 A1 | 2/2004 | Trpkovski et al. | |
| 2004/0123627 A1 | 7/2004 | Larsen et al. | |
| 2007/0221811 A1 | 9/2007 | Hauser et al. | |
| 2009/0162623 A1* | 6/2009 | Foresti | B29C 59/046 |
| | | | 428/210 |
| 2009/0176021 A1 | 7/2009 | Walsh et al. | |
| 2012/0243054 A1 | 9/2012 | Sellers | |
| 2016/0176150 A1 | 6/2016 | Trpkovski | |
| 2016/0177621 A1 | 6/2016 | Trpkovski | |

FOREIGN PATENT DOCUMENTS

| | | |
|---|---|---|
| GB | 2263440 | 7/1993 |
| WO | 03021054 | 3/2003 |
| WO | 2004094283 | 11/2004 |
| WO | 2007060353 | 5/2007 |
| WO | 2011086340 | 7/2011 |
| WO | 2013026492 | 2/2013 |
| WO | 2014075729 | 5/2014 |
| WO | 2016100855 | 6/2016 |
| WO | 2016100860 | 6/2016 |
| WO | 2016100907 | 6/2016 |

OTHER PUBLICATIONS

"Non-Final Office Action," for U.S. Appl. No. 14/973,348 dated May 23, 2018 (10 pages).

"Non-Final Office Action," for U.S. Appl. No. 14/973,348 dated Nov. 16, 2017 (20 pages).

"Response to Non Final Office Action," for U.S. Appl. No. 14/973,348, filed Feb. 14, 2018 (9 pages).

"International Search Report and Written Opinion," for PCT Application No. PCT/US2015/066751, dated Apr. 14, 2016 (13 pages).

"International Search Report and Written Opinion," for PCT Application No. PCT/US2015/066856, dated Mar. 29, 2016 (14 pages).

"Invitation to Pay Additional Fees and Partial Search Report," for PCT Application No. PCT/US2015/066765, dated Apr. 1, 2016 (6 pages).

"International Preliminary Report on Patentability," for PCT Application No. PCT/US2015/066751 dated Jun. 29, 2017 (10 pages).

"International Preliminary Report on Patentability," for PCT Application No. PCT/US2015/066765 dated Jun. 29, 2017 (13 pages).

"International Preliminary Report on Patentability," for PCT Application No. PCT/US2015/066856 dated Jun. 29, 2017 (10 pages).

Cassity, "Faux Frosted Glass Tutorial," REMODELaholic 2010 retrieved from URL <https://www.remodelaholic.com/faux-frosted-glass-guest/> Aug. 21, 2018 (17 pages).

"Non-Final Office Action," for U.S. Appl. No. 14/973,229 dated Aug. 31, 2018 (26 pages).

"Response to Non Final Office Action," for U.S. Appl. No. 14/973,229, filed Nov. 21, 2018 (9 pages).

"Response to Non Final Office Action," for U.S. Appl. No. 14/973,348, filed Jul. 26, 2018 (11 pages).

"Definition of term Strip," Merriam Webster Dictionary retrieved from URL <https://www.merriam-webster.com/dictionary/strip> in 2019 (15 pages).

"Final Office Action," for U.S. Appl. No. 14/973,229 dated Jan. 25, 2019 (13 pages).

"Response to Final Office Action," for U.S. Appl. No. 14/976,229, filed Apr. 12, 2019 (10 pages).

"Non-Final Office Action," for U.S. Appl. No. 14/973,229 dated Aug. 12, 2019 (12 pages).

* cited by examiner

ROLLER MASKING SYSTEM AND METHOD

CLAIM OF PRIORITY

This application claims the benefit of U.S. Provisional Application No. 62/094,354, filed Dec. 19, 2014, the content of which is herein incorporated by reference in its entirety.

FIELD OF THE TECHNOLOGY

The present application relates to a system of applying a masking material to a glass unit. More specifically, the present application relates to applying a masking material with a roller.

BACKGROUND

Nearly all new buildings and homes have windows. Windows frequently include at least one fragile glass pane disposed within a frame. It is frequently desired that the windows are clear and easy to see through; therefore the glass is normally desired to be free of scratches, cracks or chips. The assembly of the frame around the glass can subject the glass to being damaged. Similarly, transportation of the window or installation of the window can also subject the glass to being damaged.

Accordingly, there is a need for a system and method to apply a protective coating to the glass that can be removed at some time after the window is installed.

SUMMARY

Embodiments disclosed herein include a method of applying a masking material to a planar substrate. The method can include applying a masking material to a roller; and transferring the masking material from the roller to a surface of the planar substrate.

In various embodiments, the method can further include cutting the masking on the roller, wherein cutting the masking material separates the masking material into a desired portion of masking material and an excess masking material portion.

In various embodiments, the method can further include removing the excess masking material from the roller.

In an embodiment, the excess masking material is removed from the roller with a waste removal element.

In an embodiment, the masking material is applied at a first location and the masking material is cut at a second location.

In an embodiment, the roller is rotated around a central rotation axis from the first location to the second location.

In an embodiment, the masking is transferred from the roller to the surface of the planar substrate at a third location.

In an embodiment, the roller is rotated around a central rotation axis from the first location to the second location to the third location and back to the first location.

In an embodiment, the masking material is applied at a first location and the masking material is transferred at a second location.

In an embodiment, the roller is rotated around a central rotation axis from the first location to the second location.

Embodiments disclosed herein include a system for applying masking material to a planar substrate. The system can include a masking material application location where a masking material is applied to a roller; and a transfer location where at least a portion of the masking material is transferred from the roller to a surface of a planar substrate.

In an embodiment, the system can further include a masking material cutting location where the masking material that was applied to the roller is cut to define a portion of the masking material as excess masking material and a remaining portion of the masking as desired masking material, wherein the desired masking material is transferred to the surface of the planar substrate.

In an embodiment, the system can further include a waste removal location where the excess masking material is removed from the roller.

In an embodiment, the system can further include an excess material removal element configured to remove the excess masking material from the roller at the waste removal location.

In an embodiment, the masking material application location comprises a first roll of masking material configured to apply masking material to the roller.

In an embodiment, the masking material application location comprises a first roll of masking material and a second roll of masking material, wherein the first roll of masking material is configured to apply masking material to the roller and the second roll of masking material is configured to apply masking material to the roller.

In an embodiment, the masking material application location and the transfer location are located around a central rotation axis.

In an embodiment, the roller is configured to rotate around the central rotation axis from the masking material application location to the transfer location.

In an embodiment, the masking material application location, the transfer location, and the cutting location are located around a central rotation axis.

In an embodiment, the roller is configured to rotate around the central rotation axis from the masking material application location to the cutting location to the transfer location and back to the masking material application location.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present application is defined by the appended claims and their legal equivalents.

BRIEF DESCRIPTION OF THE FIGURES

The technology may be more completely understood in connection with the following drawings, in which.

Figure 1:
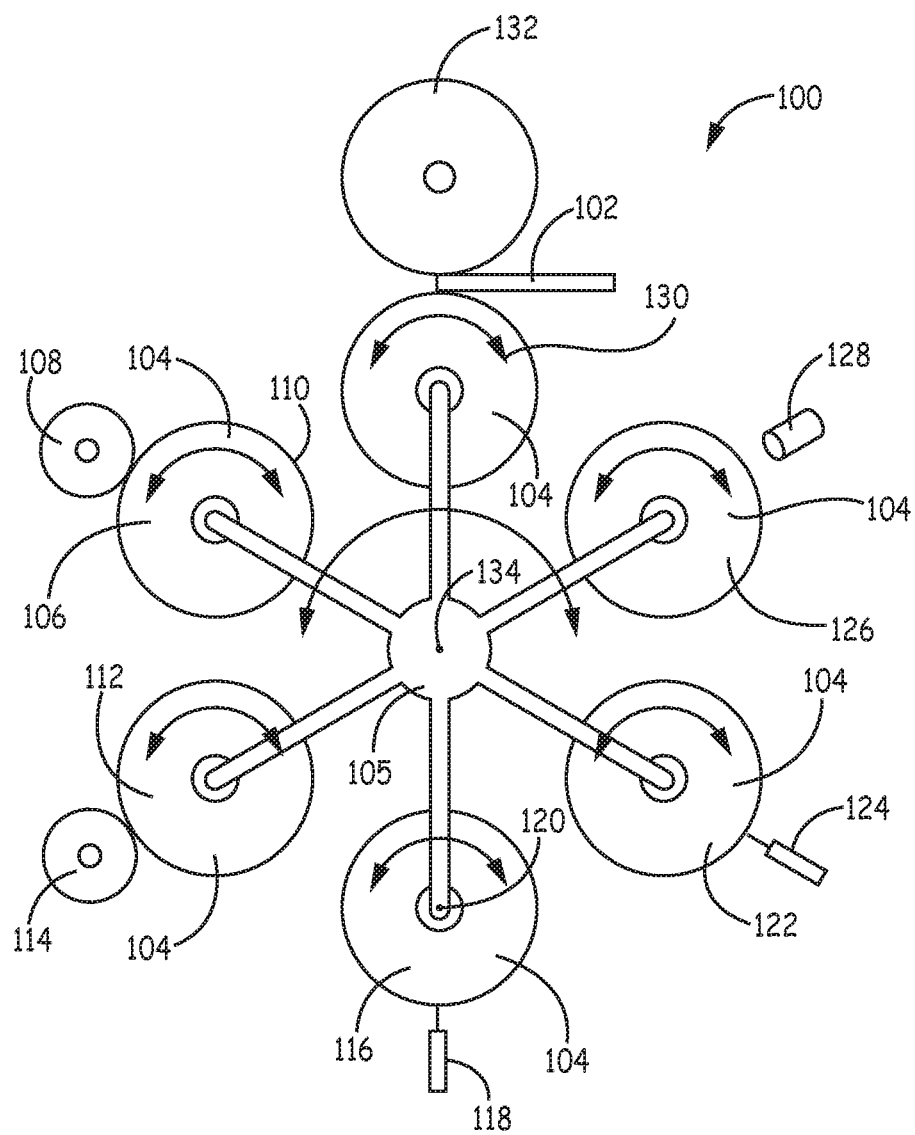
FIG. 1 is a top view of a masking system, according to an embodiment.

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

A mask or film can be applied to an exterior glass surface of a window or a window component, such as to protect the glass from damage during assembly, transportation and installation. The mask can be applied to a window component, such as a glass unit. In various embodiments, a glass unit includes one or more panes of glass, such as two or three panes of glass that are sealed together and optionally have a space between. The mask can be applied to an inside area of the external surface of the glass, such as to leave a perimeter region that is unmasked. In some embodiments, a frame can be coupled to the glass unit. The frame can substantially cover the perimeter region. Therefore, in some embodiments, the external surface of the glass can be substantially covered by the mask and the frame prior to transporting the window or installing the window.

In various embodiments, the mask can be prepared prior to being applied to the glass unit. The mask can be prepared, such that the mask is formed to a desired size and shape. In some embodiments, the mask is prepared on a staging surface. The staging surface can be a surface that holds the mask while it is being prepared. The mask can then be transferred from the staging surface to the glass unit. In various embodiments, the mask can be transferred to a planar substrate, such as a sheet of glass, a sheet of a polymer, or the like. A planar substrate can include a glass unit.

In an embodiment, a roller can include a staging surface. In an embodiment, the staging surface can be a surface of a cylinder. In an embodiment, the staging surface can include a portion of a surface of a cylinder, such as the staging surface does not form a complete circle, such as a U-shape or another non-linear surface. In an embodiment, the staging surface can include a flexible non-planar surface. In an embodiment, a system can include a staging surface, such as a portion of a roller. In some embodiments, the system can include multiple staging surfaces, such as two, three, four, five, or six.

In an embodiment, the system can include one or more rolls of masking material. The one or more rolls of masking material can be configured to apply masking material onto the staging surface. In an embodiment, the masking material can include a first surface and a second surface, such as the masking material can be in the form of a sheet. The first surface can be adjacent to or temporarily adhered to the staging surface. The second surface can be the surface that will be adjacent to or adhered to the glass unit. In various embodiments, an adhesive is disposed on the second surface, such as to adhere the masking material to the glass unit. The masking material can be temporarily adhered to the staging surface such as with a negative pressure differential, a vacuum, an adhesive, an electrostatic force, or a magnetic force.

In various embodiments, the system can include one or more cutting elements. The one or more cutting elements can cut or trim the masking material on the staging surface, such as to separate the masking material into desired masking material and excess or waste masking material. The desired masking material can be the mask that will be transferred from the staging surface to the glass unit. The excess or waste masking material can include masking material that was applied to the staging surface but is not going to be applied to the glass unit.

In various embodiments, the system can include a waste removal element, such as an element that removes the excess or waste masking material from the staging surface prior to transferring the mask from the staging surface to the glass unit. The waste removal element can use an adhesive, a negative pressure, a vacuum, an electrostatic force or a magnetic force to separate the excess or waste masking material from the staging surface, such as to discard that portion of the masking material.

In some embodiments, a method can include applying masking material to a staging surface, such as a roller. The method can further include cutting or trimming the masking material, such as to define desired masking material and waste or excess masking material. The desired masking material can have the shape and size of the area on the glass unit that will be masked. The method can include removing the excess or waste material from the staging surface. The excess or waste material can be removed from the staging surface, such that only desired masking material remains on the staging surface. The method can include transferring the desired masking material (or mask) from the staging surface to a glass unit, such as be contacting a side of the masking material with adhesive to a surface of the glass unit.

FIG. 1 shows a top view of a masking system 100, according to an embodiment. The masking system 100 can be configured to apply a mask to glass unit 102. The mask can include a masking material. The mask can be applied to one or more exterior surfaces of the glass unit 102, such as to protect glass unit from damage during assembly, transportation or installation.

In an embodiment, the masking material can include a substrate and an adhesive, such as to result in an adhesive side and a non-adhesive side. In an embodiment, the masking material can include a first surface and a second surface, such as when the masking material is a sheet. An adhesive can be disposed on the second surface. The first surface can contact the roller when the masking material is on the roller. The second surface can contact the glass unit when the masking material is applied to the glass unit. In an embodiment, the masking material can include a polymer, such as a transparent or translucent polymer.

Figure 7:
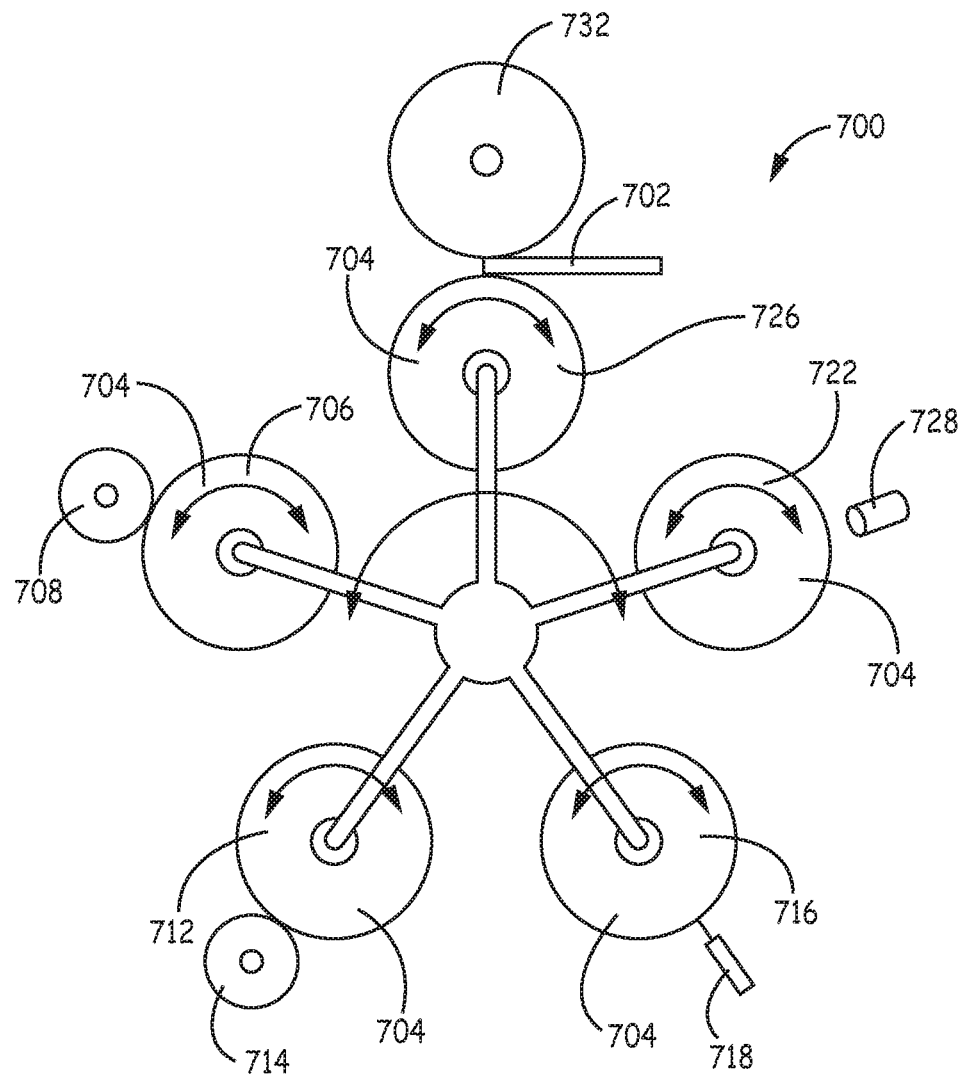
FIG. 7 is a top view of a masking system, according to an embodiment.
Figure 8:
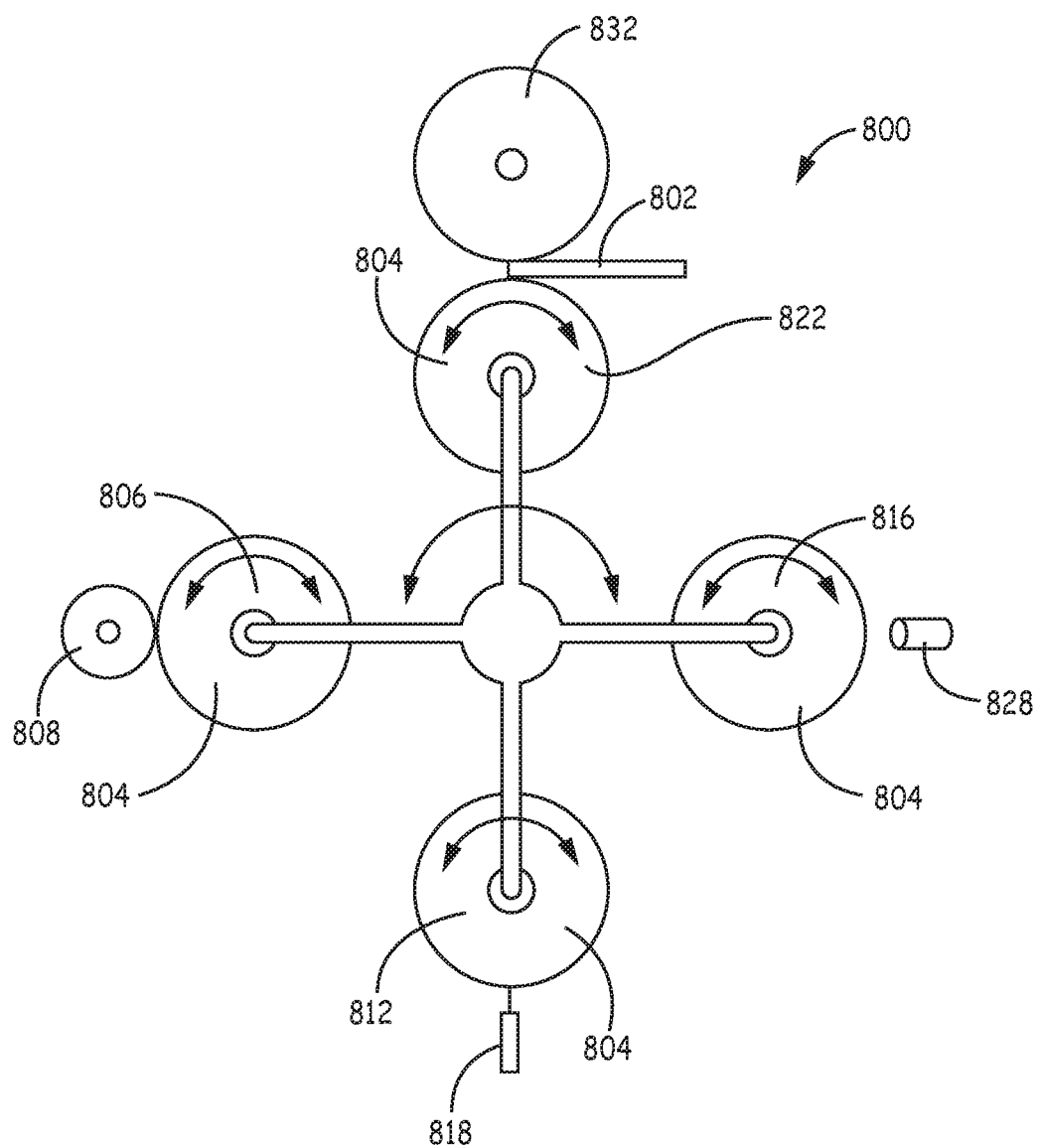
FIG. 8 is a top view of a masking system, according to an embodiment.
Figure 9:
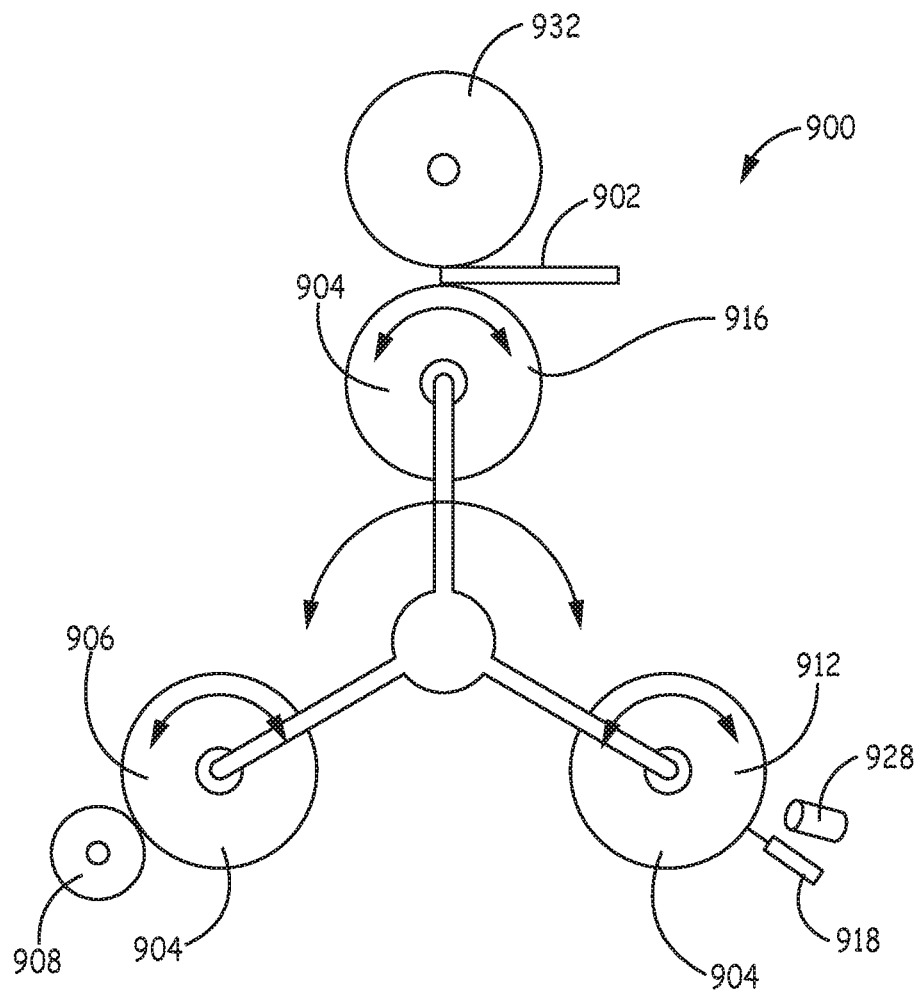
FIG. 9 is a top view of a masking system, according to an embodiment.

The system 100 can include one or more rollers 104. In an embodiment, the system 100 includes six rollers 104. In an embodiment, the system can include five rollers, such as shown in FIG. 7. In an embodiment, the system can include four rollers, such as shown in FIG. 8. In an embodiment, the system can include three rollers, such as shown in FIG. 9. In an embodiment, the system can include two rollers. In an embodiment, the system can include a single roller. In various embodiments, the rollers 104 can be coupled to a carousel 105.

In an embodiment, the roller 104 can include a vacuum roller. The vacuum roller can be configured to draw a vacuum or suction pulling towards the inside of the vacuum roller from a cylindrical surface of the vacuum roller. In an embodiment, the vacuum roller can be coupled to a vacuum line, such as a pipe or tube that creates a negative pressure differential relative to the surrounding environment. The negative pressure or vacuum inside the vacuum roller can hold masking material along the outer cylindrical surface of the vacuum roller. In various embodiments, the masking material can include one side with an adhesive and one side without an adhesive. The non-adhesive side can contact to the vacuum roller and the negative pressure differential or vacuum of the vacuum roller can be used to hold the masking material in contact with the vacuum roller. The side with adhesive can be configured to adhere to a glass unit using the adhesive. The roller is described in further detail in FIG. 10.

In some embodiments, the roller 104 can use an electrostatic force to hold the masking material in contact with the roller. In some embodiments, the roller 104 can use an adhesive to hold the masking material in contact with the roller. In some embodiments, the roller 104 can use a magnetic force to hold the masking material in contact with the roller.

Figure 2:
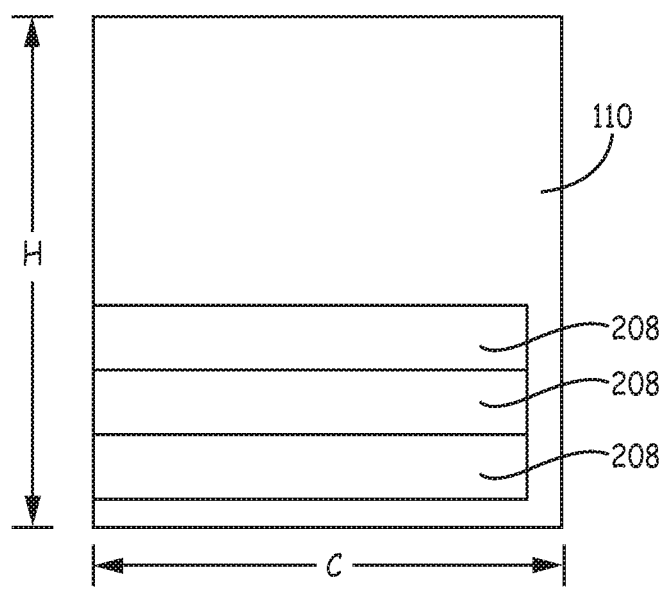
FIG. 2 is a view of the surface area of a roller after the first location, according to an embodiment.

A first roller 104 can be located in a first location 106. The first location can include a first roll of masking material 108. In the first location 106, masking material can be applied to the surface 110 of the roller 104. The first roll of masking material 108 can be configured to apply masking material onto the surface 110 of a roller 104. In an embodiment, one or more strips of masking material are applied to the surface 110 from the first roll of masking material 108. The strips can be cut to a desired length, such as the length of the area to be masked on the designated glass unit. The strips can be disposed on the surface 110, such that they are parallel with each other. Additional strips can be added at the first location 106 or the second location 112 until a desired height is reached, such as a height that is greater than or equal to the height of the area to be masked on the designated glass unit. One example of the surface 110 of the roller 104 after masking material is applied from the first roll of masking material 108 is shown in FIG. 2.

Figure 3:
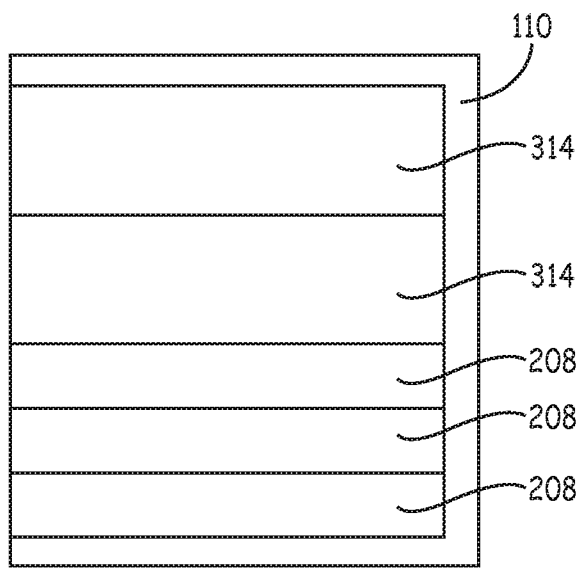
FIG. 3 is a view of the surface area of a roller after the second location, according to an embodiment.

The system 100 can further include a second location 112. The system 100 can include a second roll of masking material 114. A roller 104 that is located in the second location 112 can have masking material applied to it from the second roll of masking material 114. The surface 110 of a roller 104 after the masking material is applied from the second roll of masking material 114 is shown in FIG. 3.

In various embodiments, the system 100 can include a third location 116. The system 100 can include a first cutting element 118, such as at the third location 116. The first cutting element 118 can be used to cut the masking material on the roller 104, such as to cut the masking material along a line that separates desired masking material from waste or excess masking material. The first cutting element 118 can be used to cut the masking material on the roller 104, such as to a desired height. The desired height can be equal to the height of the area to be masked on the designated glass unit. The waste masking material can refer to masking material that is on the vacuum roll, but will not be applied to the glass unit. The waste masking material can be removed from the surface 110 of the roller 104 prior to transferring the masking material from the roller 104 to the glass unit. In an embodiment, the first cutting element 118 can include a laser cutting device. In an embodiment, the first cutting element 118 can include cutting roll.

Figure 4:
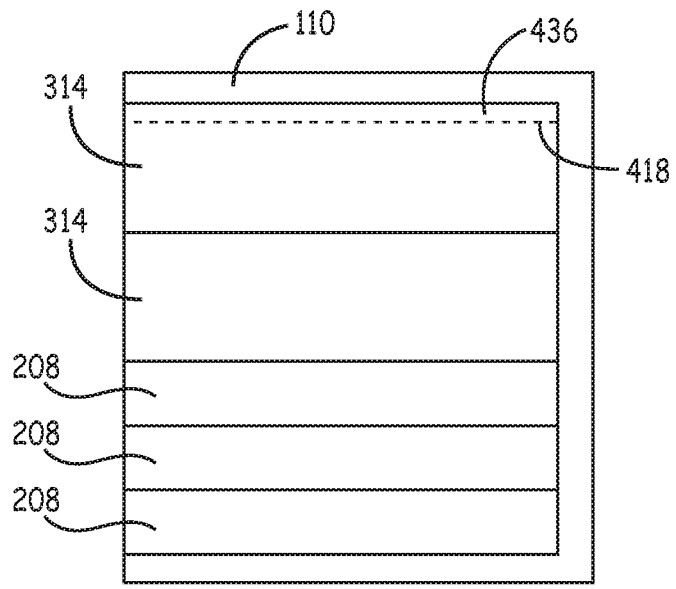
FIG. 4 is a view of the surface area of a roller after the third location, according to an embodiment.

In some embodiments, the first cutting element 118 can travel along a vertical axis to cut the masking material at the desired height. In some embodiments, such as where the cutting element 118 is a cutting roll, the first cutting element can travel toward and away from the roller 104 to be brought in and out of contact with the masking material on the roller 104. As the roller 104 rotates and the first cutting element 118 stays in place, the first cutting element 118 can create a cut line that is a circumferential path around the roller 104. In an embodiment, the first cutting element 118 cuts the masking material to define the top edge of the desired masking material on the roller 104. The surface 110 of a roller 104 after the third location 116 is shown in FIG. 4.

In some embodiments, the first cutting element 118 is also configured to make vertically-oriented cut lines in the masking material along the height of the masking roller 104.

In various embodiments, the system 100 can further include a fourth location 122. The system can include a second cutting element 124, such as at the fourth location 122. In some embodiments, the second cutting element 124 can be used to further cut the masking material on the surface 110 of the roller 104 in the fourth location 122. The second cutting element 124 can cut the masking material, such as to further define desired masking material and waste masking material. In an embodiment, the second cutting element 124 can be used to cut the masking material within the outer perimeter of the masking material, such as to define unmasked areas where muntin bars will be installed on the glass unit.

Similar to the first cutting element 118, in some embodiments, the second cutting element 124 can be able to travel along a vertical axis. In some embodiments, such as where the cutting element 124 is a cutting roll, the first cutting element can travel toward and away from the roller 104 to be brought in and out of contact with the masking material on the roller 104. In some embodiments, the first cutting element 118 is also configured to make vertically-oriented cut lines in the masking material along the height of the masking roller 104.

In various embodiments, the system 100 can further include a fifth location 126. The system 100 can include a waste removal element 128, such as at the fifth location 126. The waste removal element 128 can be configured to remove the waste masking material that has been separated from the desired masking material, such as by first or second cutting elements 118, 124.

In an embodiment, the waste removal element 128 can include a suction element to remove the waste masking material from the surface 110 of the roller 104. The suction element can produce a vacuum or a negative pressure relative to the surrounding environment or vacuum roll 104 to take away the waste masking material. In an embodiment, the waste removal element 128 can include a picking element. The picking element can grab or pick the waste masking material from the surface 110 of the roller 104 and transport the waste masking material away from the roller 104. In alternative embodiments, the waste removal element 128 can use an electrostatic force or a magnetic force to remove the waste masking material. In an embodiment, the waste removal element 128 uses an adhesive to remove the waste material, such as the adhesive on the masking material.

In various embodiments, the waste removal element 128 can be configured to travel along a vertical axis. The roller 104 can rotate around a roller central axis 120 to change the relative location of the waste removal element 128 to the waste masking material. In various embodiments, the roller 104 can rotated around its roller central axis 120 at any of the locations.

In various embodiments, the system 100 can further include a sixth location 130. When the roller 104 is in the sixth location 130, the roller 104 can transfer the desired masking material from the roller 104 to a glass unit 102, such as by contacting the adhesive side of the masking material to the glass unit. The roller 104 can rotate as the glass unit 102 passes by the roller 104 to transfer the masking material evenly.

FIG. 1 shows a back side roller 132, which is on the opposite side of glass unit 102 from the roller 104 of the sixth location. In an embodiment, roller 132 represents a runner wheel configured to support the glass unit 102 on the side opposite from the side that the masking material is being applied to. In an alternative embodiment, roller 132 represents a roller, such as to apply masking material to two sides of the glass unit 102 simultaneously. The roller 132 can be a roller of a second system similar to the system 100. In an alternative embodiment, the glass unit 102 rests on an assembly surface instead of being supported by a back side roller 132. The distance between the roller 132 and roller 104 in the sixth location can change, such as to accommodate glass units 102 of different widths. In an embodiment, the roller 132 can translate or slide perpendicular to the path of the glass unit 102, such as to vary the distance between roller 132 and roller 104 (in the sixth location 130). In an embodiment, the roller 104 in the sixth location can translate or slide perpendicular to the path of the glass unit 102. In an embodiment, the carousel 105 can translate or slide perpendicular to the path of the glass unit 102 relative to the roller 132 to accommodate glass units with different widths. In one embodiment, an assembly surface supports the glass unit and is angled about six degrees from a vertical orientation.

In FIG. 1, the carousel 105 of rollers 104 can rotate counter clockwise around the central rotation axis 134, such as to move the rollers 104 to subsequent locations (e.g. from the first location to the second location, the second location to the third location, third location to the fourth location, fourth location to the fifth location, fifth location to the sixth location, and sixth location to the first location to repeat the cycle). In an alternative embodiment, the locations 106, 112, 116, 122, 126 can be reversed and the rollers 104 can rotate clockwise around the central rotation axis 134. In an embodiment, the rollers 104 can rotate counter clockwise of a period of time and clockwise for a period of time, such as to move a roller back and forth between two locations.

In an alternative embodiment, the rollers 104 can be aligned linearly, such as in a line. The line of rollers 104 could move in a direction parallel with the glass unit 102, such as to move the rollers 104 to different locations. In an alternative embodiment, the rollers 104 can be aligned linearly and once a roller reaches the end of the line, the roller can circle back to the start of the line of rollers.

FIG. 2 shows a plan view of the surface 110 of a roller 104 after the masking material 208 is applied to the surface 110 at the first location 106 from the first roll of masking material 108. The amount of masking material 208 that is applied to the surface 110 can vary depending on the size of the glass unit 102 that will be masked. In embodiments where the surface area of the glass unit to be masked is smaller than the surface 110, only a portion of the surface 110 will be covered with masking material. FIG. 2 shows an embodiment where the glass unit 102 that will be masked is not as long as the circumference of the roller 104. Therefore the strips of masking material 208 do not extend across the entire surface 110. The strips of masking material 208 can have the same length as the desired area to be masked on the glass unit.

The roller 104 can have a circumference (dimension "C" in FIG. 2) at least as large as the length of the longest glass unit 102 that will be masked using the system. In an embodiment, the diameter of the roller 104 can be at least 10 inches (25.4 cm). In an embodiment, the diameter of the roller 104 can be at least 12 inches (30.5 cm). In an embodiment, the diameter of the roller 104 is not more than 60 inches (1.52 m). In an embodiment, the diameter of the roller 104 is not more than 100 inches (2.54 m). In one embodiment, the diameter of the roller 104 is 30 inches (76.2 cm). The circumference of a cylinder is found by multiplying pi times the diameter. A roller 104 with a 30 inch (76.2 cm) diameter has a circumference of about 94 inches (2.39 m).

In one embodiment, the roller 104 has diameter of about 20 inches (50.8 cm) and a circumference of about 63 inches (1.60 m). In one embodiment, the roller 104 has diameter of about 60 inches (1.52 m) and a circumference of about 188 inches (4.78 m). In one embodiment, the roller 104 has diameter of about 90 inches (2.29 m) and a circumference of about 283 inches (7.19 m).

The roller 104 can have a height (dimension "H" in FIG. 2) at least as large as a largest height dimension of the various glass units that will be masked by the system. The term "height dimension" of a glass unit as used herein refers to the dimension of the glass unit in a direction parallel to a central axis of a roller that is used to apply the masking material. In some embodiments, as in FIG. 1, the height dimension of the glass unit will be measured in a generally vertical direction when the glass unit is positioned on or within the assembly equipment, though this is not required. In some embodiments, the height dimension of the glass unit will be measured in a generally horizontal direction when the glass unit is positioned on or within the assembly equipment.

In some embodiments, as in FIG. 1, the height dimension of the glass unit will be perpendicular to the machine direction of the assembly equipment, though this is not required. Alternatively, in some embodiments, the height dimension of the glass unit will be parallel to the machine direction of the assembly equipment.

In an embodiment, the height of the roller 104 can be at least 14 inches (35.6 cm) and not more than 120 inches (3.05 m). In an embodiment, the height of the roller 104 can be at least 40 inches (1.02 m) and not more than 100 inches (2.54 m). In an embodiment, the height of the roller 104 can be at least 50 inches (1.27 m) and not more than 90 inches (2.23 m). In an embodiment, the height of the roller 104 can be at least 60 inches (1.52 m) and not more than 84 inches (2.13 m).

FIG. 3 shows a view of the surface 110 of a roller 104 after masking material 314 is applied to the surface 110 at the second location 112. In various embodiments after the second location 112, both masking material 208 and masking material 314 will have been applied to the surface 110. The height of the masking material 208 and the height of masking material 314 can differ, such that the two sizes can be optimized for the given height of the desired area to be masked on the glass unit, such as to minimize the amount of waste masking material. In the embodiment shown in FIG. 3, there were two strips of masking material 314 applied at the second location 112 and three strips of masking material 208 applied at the first location 106. For some glass units, masking material is only applied at the first location 106 or at the second location 112.

FIG. 4 shows a plan view of the surface 110 of a roller 104 after it has been cut by the first cutting element 118 at the third location 116. The third location 116 can include a first cutting element 118, such as to cut the masking material 208, 314 to a desired size.

FIG. 4 shows cut line 418 created by the first cutting element 118. In an embodiment, the cut line 418 separates a portion of the masking material 436 from the rest of the masking material 208, 314. The masking material 436 can be waste masking material and discarded or removed from the surface 110, such as at the fifth location 126.

Figure 5:
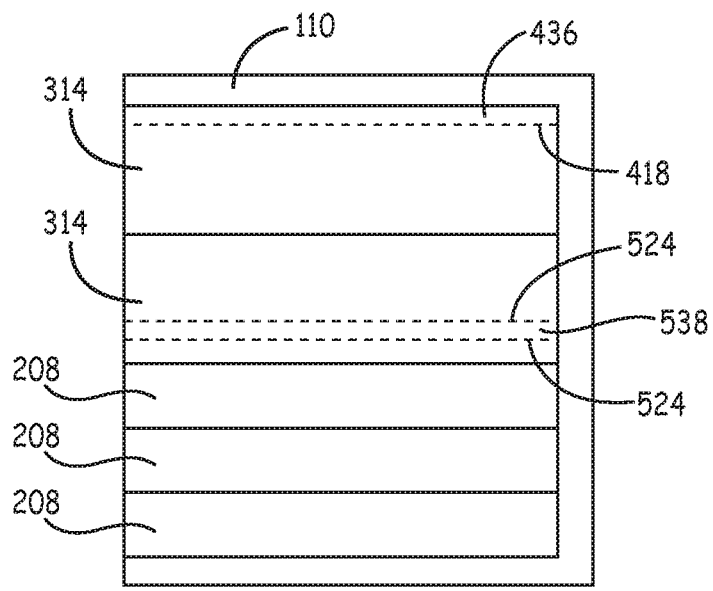
FIG. 5 is a view of the surface area of a roller after the fourth location, according to an embodiment.

FIG. 5 shows a view of the surface 110 of a roller 104 after it has been cut by the second cutting element 124 at the fourth location 122. The fourth location 122 can include a second cutting element 124, such as to cut the masking material 208, 314 to define additional unnecessary portions of masking material, such as masking material that would have otherwise been located underneath a muntin bar.

FIG. 5 shows two additional cut lines 524 created by the second cutting element 124. In an embodiment, the two cut lines 524 separate a portion of masking material 538 from the rest of the masking material 208, 314. The masking material 538 can be waste masking material and discarded or removed from the surface 110, such as at the fifth location 126.

Figure 6:
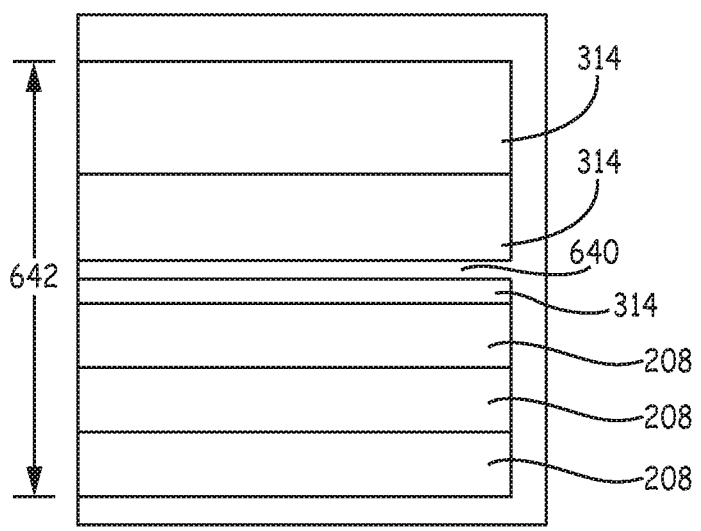
FIG. 6 is a view of the surface area of a roller after the fifth location, according to an embodiment.

FIG. 6 shows the surface 110 of a roller 104 after the waste material 436 538 has been removed by the waste removal element at the fifth location 126. The remaining masking material 208, 314 can be desired masking material that will be applied to the surface of a glass unit at the sixth location 130. The masking material 208, 314 can define a gap 640. The gap 640 is configured to accommodate a muntin bar that will be disposed on the exterior surface of the glass unit later in the assembly process. The removal of masking material 436 can result in the masking material 208, 314 having a height 642 equal to the desired dimension of the glass unit that the masking material 208, 314 will be applied to at the sixth location 130.

In an alternative embodiment, all or some of the waste masking material is not removed from the glass unit at the fifth location 126. In this scenario, some of the waste masking material is applied to the glass unit and is then removed from that glass unit 102. In one embodiment, waste masking material that is oriented to extend in a direction along an axis of the roller is removed after it is applied to the glass.

FIG. 7 shows a top view of a masking system 700, according to an embodiment. The system 700 can include five rollers 704 at five locations. The system 700 can include a first location 706. The first location 706 can be similar to the first location 106 in system 100. The first location 706 can include a first roll of masking material 708 configured to apply masking material to a surface of a roller 704 in the first location. The surface area of the roller 704 after the masking material has been applied at the first location 706 can be similar to FIG. 2.

The system 700 can include a second location 712, similar to the second location 112 in system 100 described above. The second location 712 can include a second roll of masking material 714 configured to apply masking material to a surface of a roller 704 in the second location 712. The surface area of the roller 704 after the masking material has been applied at the second location can be similar to FIG. 3.

The system 700 can include a third location 716, similar to the third location 116 in system 100 described above. The third location 716 can include a first cutting element 718 configured to cut the masking material on the vacuum roll 704 that is in the third location 716. The first cutting element 718 can make a plurality of cuts in the masking material, if necessary, such as to cut the masking material to the desired height and to cut out waste material to accommodate for muntin bars. In an embodiment, the third location 716 can include a first cutting element 718 and a second cutting element. In one embodiment, the multiple cutting elements can perform multiple cuts in different directions, simultaneously or both. The surface area of the roller 704 with the cuts in the masking material can be similar to FIG. 5.

The system 700 can include a fourth location 722, similar to the fifth location 126 in system 100. The fourth location 722 can include a waste removal element 728 configured to remove waste masking material that is on the surface of the roller 704 that is in the fourth location 722. The waste removal element 728 can be similar to the waste removal element 128 described above. The surface area of the roller 704 with the waste masking material removed can be similar to FIG. 6.

The system 700 can include a fifth location 726. The fifth location 726 can be similar to the sixth location 130 in system 100 described above. In the fifth location 726, the roller 704 can be configured such that the masking material on the surface of the roller 704 contacts a glass unit 702. In the fifth location 726, a roller 704 can transfer the masking material from its surface to the surface of a glass unit 702, such as by rotating the roller 704 as the glass unit 702 passes by the roller 704. The system 700 can include a back side roller 732 on the opposite side of the glass unit 702 from the roller 704 in the fifth location 726. The back side roller 732 can be similar to the roller 132 shown in FIG. 1 and discussed above. The back side roller 732 can represent a support roller or a roller as part of an assembly to apply a masking material to the other side of the glass unit 702. In an alternative embodiment, the glass unit 702 rests on an assembly surface instead of being supported by back side roller 732. In one embodiment, an assembly surface supports the glass unit and is angled about six degrees from a vertical orientation.

FIG. 8 shows a top view of a masking system 800, according to an embodiment. The system 800 can include four rollers 804 at four locations. The system 800 can include a first location 806. The first location 806 can be similar to the first location 106 and the second location 112 in system 100. The first location 806 can include a first roll of masking material 808 configured to apply masking material to a surface of the roller 804 in the first location. In some embodiments, the first location 806 can also include a second roll of masking material configured to apply masking material to the surface of the roller 804. In an embodiment, the first roll of masking material and the second roll of masking material can apply masking material to the roller in the first location 806 simultaneously. In an alternative embodiment, the second roll of masking material can apply masking material to the roller 804 after the first roll has completed applying masking material to the roller 804 The surface area of the roller 804 after the masking material has been applied at the first location 806 can be similar to FIG. 3.

The system 800 can include a second location 812, similar to the fourth location 716 in system 700 described above. The second location 812 can include a first cutting element 818 configured to cut the masking material on the vacuum roll 804 that is in the second location 816. The first cutting element 818 can make a plurality of cuts in the masking material, if necessary, such as to cut the masking material to the desired height and to cut out waste material to accommodate for muntin bars. In an embodiment, the second location 812 can include a first cutting element 818 and a second cutting element, such as to perform multiple cuts in different directions, simultaneously or both. The surface area of the roller 804 with the cuts in the masking material can be similar to FIG. 5.

The system 800 can include a third location 816, similar to the fifth location 126 in system 100. The third location 816 can include a waste removal element 828 configured to remove waste masking material that is on the surface of the roller 804 that is in the third location 816. The waste removal element 828 can be similar to the waste removal element 128 described above. The surface area of the roller 804 with the waste masking material removed can be similar to FIG. 6.

The system 800 can include a fourth location 822. The fourth location 822 can be similar to the sixth location 130 in system 100 described above. In the fourth location 822, the roller 804 can be configured such that the masking material on the surface of the roller 804 contacts a glass unit 802. In the fourth location 822, a roller 804 can transfer the masking material from its surface to the surface of a glass unit 802, such as by rotating the roller 804 as the glass unit 802 passes by the roller 804. The system 800 can include a roller 832 on the opposite side of the glass unit 802 from the roller 804 in the fourth location 822. The roller 832 can be similar to the roller 132 shown in FIG. 1 and discussed above. The roller 832 can represent a support roller or a roller as part of a system to apply a masking material to the other side of the glass unit 802. In an alternative embodiment, the glass unit 802 rests on an assembly surface instead of being supported by a back side roller 832. In one embodiment, an assembly surface supports the glass unit and is angled about six degrees from a vertical orientation.

FIG. 9 shows a top view of a masking system 900, according to an embodiment. The system 900 can include three rollers 904 at three locations. The system 900 can include a first location 906. The first location 906 can be similar to the first location 806 in system 800. The first location 906 can include a first roll of masking material 908 configured to apply masking material to a surface of the roller 904 in the first location. In some embodiments, the first location 906 can also include a second roll of masking material configured to apply masking material to the surface of the roller 904. In an embodiment, the first roll of masking material and the second roll of masking material can apply masking material to the roller in the first location 906 simultaneously. In an alternative embodiment, the second roll of masking material can apply masking material to the roller 904 after the first roll has completed applying masking material to the roller 904 The surface area of the roller 904 after the masking material has been applied at the first location 906 can be similar to FIG. 3.

The system 900 can include a second location 912, similar to a combination of the third location 816 and fourth location 822 in system 800 described above. The second location 912 can include a first cutting element 918 configured to cut the masking material on the vacuum roll 904 that is in the second location 912. The first cutting element 918 can make a plurality of cuts in the masking material, if necessary, such as to cut the masking material to the desired height and to cut out waste material to accommodate for muntin bars. In an embodiment, the second location 912 can include a first cutting element 918 and a second cutting element, such as to perform multiple cuts in different directions, simultaneously or both.

The second location 912 can further include a waste removal element 928 configured to remove waste masking material that is on the surface of the roller 904 that is in the second location 912. The waste removal element 928 can be similar to the waste removal element 128 described above. The surface area of the roller 904 with the waste masking material removed can be similar to FIG. 6.

The system 900 can include a third location 916. The third location 916 can be similar to the sixth location 130 in system 100 described above. In the third location 916, the roller 904 can be configured such that the masking material on the surface of the roller 904 contacts a glass unit 902. In the third location 916, a roller 904 can transfer the masking material from its surface to the surface of a glass unit 902, such as by rotating the roller 904 as the glass unit 902 passes by the roller 904. The system 900 can include a back side roller 932 on the opposite side of the glass unit 902 from the roller 904 in the third location 916. The back side roller 932 can be similar to the roller 132 shown in FIG. 1 and discussed above. The back side roller 932 can represent a support roller or a roller as part of a system to apply a masking material to the other side of the glass unit 902. In an alternative embodiment, the glass unit 902 rests on an assembly surface instead of being supported by a back side roller 932. In one embodiment, an assembly surface supports the glass unit and is angled about six degrees from a vertical orientation.

Figure 10:
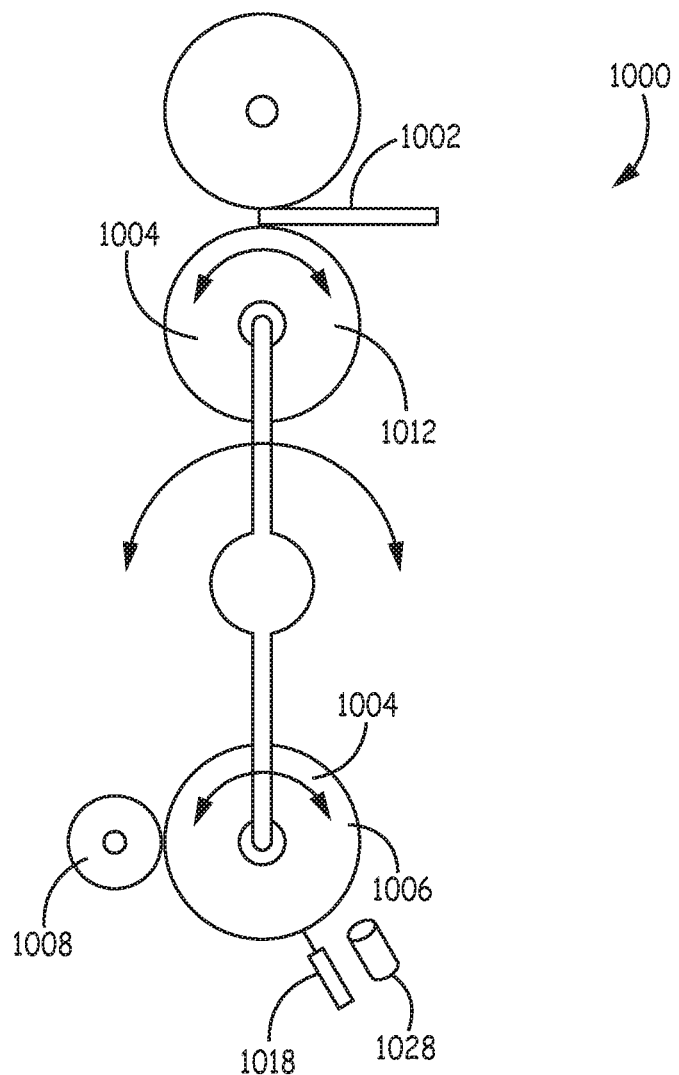
FIG. 10 is a top view of a masking system, according to an embodiment.

FIG. 10 shows a top view of a masking system 1000, according to an embodiment. In a two roller embodiment, the system 1000 includes two rollers 1004. The functions of applying masking material to the roller, cutting masking material, removing waste masking material and applying the masking material to the glass unit can be allocated in many different ways between the two rollers and between different roller positions, including the alternatives already discussed herein, such as the masking material being applied to a roller, masking material being cut, and excess masking material being removed from the roller at a first location 1006, and transferring the masking material to a glass unit 1002 at a second location 1012. The first location 1006 can include a first roll of masking material 1008, a first cutting element 1018, and a waste removal element 1028.

Figure 11:
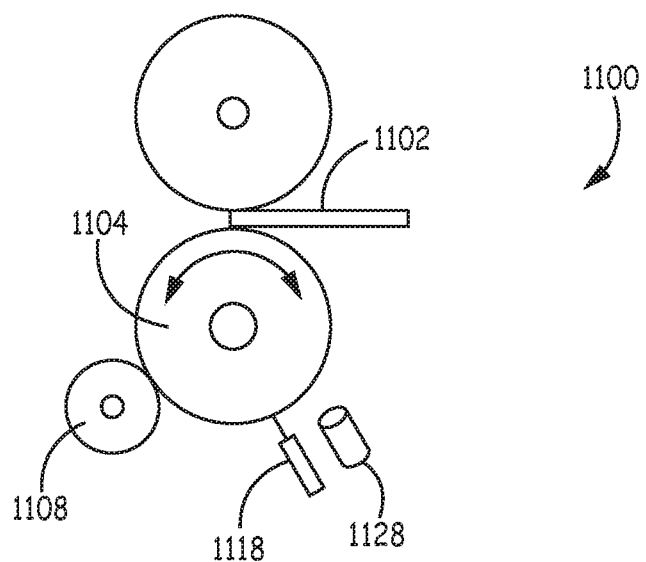
FIG. 11 is a top view of a masking system, according to an embodiment.

FIG. 11 shows a top view of a masking system 1100, according to an embodiment. In a single roller system 1100, the roller 1104 is brought into contact with the glass unit 1102, in one of the ways described herein with respect to the other embodiments. In one embodiment of a single roller system 1100, the roller moves in a circular path between multiple locations where the application to the roller, cutting, removing and applying to the glass unit are performed. In one embodiment (as shown in FIG. 11), the single roller remains relatively stationary, while the tools for performing the application to the roller surface 1108, cutting 1118 and removing 1128 are brought into position near the roller 1104.

In various alternative embodiments, a single roller is used to apply a masking material to a glass unit. In one such embodiment, the single roller is positioned near a roll or rolls of masking material to have a masking material applied to the cylindrical surface of the roller. After the roll or rolls are used to apply the masking material, the surface area of the roller may appear as shown in FIG. 3, in one embodiment.

Then, in one embodiment, a cutting element or cutting elements act upon the roller to cut the masking material in order to separate desired masking material from waste masking material, such as trimming a top edge using a cut line 418 as shown in FIG. 4. Additional cut lines such as cut lines 524 shown in FIG. 5 may also be made to trim interior portions of waste masking material, so that the masking material may appear like shown in FIG. 5.

In one alternative to any of the embodiments described herein, the masking material is not cut on a roller. The waste masking material can be instead cut and removed after it has been applied to the glass unit.

After the cut lines are optionally created in the single roller embodiments, then in one embodiment, the waste masking material is removed using a vacuum element or a picking element, or the like.

In alternatives to any of the embodiments described herein where cutting is performed on the roller, the waste masking material may not be removed from the roller. The waste masking material can be removed after all of the masking material has been applied to the glass unit.

In various embodiments, a roller can refer to a cylinder. In other embodiments, a roller can refer to a portion of a cylinder. In some embodiments, a roller refers to a surface that can be formed into a cylinder. In some embodiments, a roller refers to a U-shape. In some embodiments, a roller can refer to a flexible U-shape.

Figure 12A:
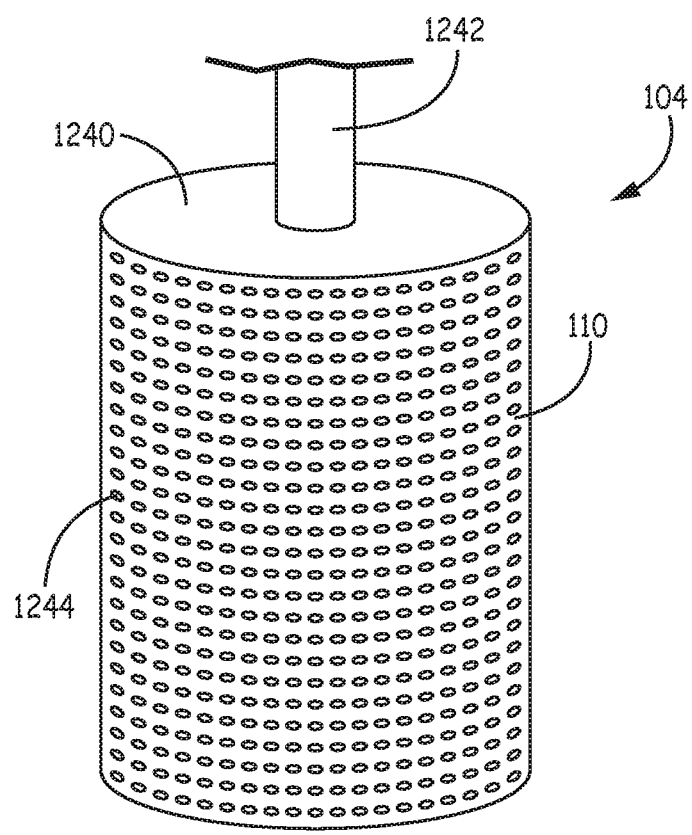
FIG. 12A is a perspective view of a roller, according to an embodiment.

FIG. 12A shows a perspective view of a roller 104, according to an embodiment. The roller can be cylindrical. The roller can have a height of at least the height of a largest glass unit that will be masked using the system. The roller can have a circumference of at least the length of the largest glass unit.

The roller 104 can have a top surface 1240. A vacuum hose 1242 can be coupled to the top surface 1240, such as when the roller 104 includes a vacuum roller. The vacuum hose 1242 can create a negative pressure differential between the inside of the roller 104 and the surrounding environment, such as to temporarily adhere masking material to the outer surface 110 of the roller 104. As discussed above, alternative rollers can include alternative methods of adhering the masking material to the outer surface 110.

The surface 110 of the roller can define a plurality of apertures 1244. The plurality of apertures 1244 can allow passage of air from the surrounding environment to the inside cavity of the roller. In an embodiment, the apertures 1244 can be circular. In an embodiment, the apertures 1244 can have a diameter of at least 0.001 inches (0.025 mm) and not more than 0.125 inches (3.175 mm). In an embodiment, the apertures 1244 can have a consistent pattern, spacing or both across the surface 110.

Figure 12B:
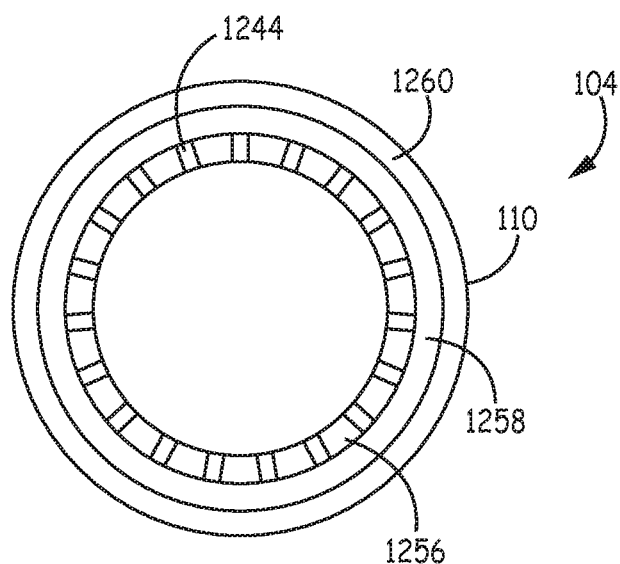
FIG. 12B is a cross-section of a roller, according to an embodiment.

FIG. 12B shows a cross-section of a roller 104, according to an embodiment. In various embodiments, the roller 104 can include multiple layers. In an embodiment, the roller can include a first layer 1256, such as an inner most layer. The first layer 1256 can include a sheet of metal or polymer. The sheet of metal or polymer can define a plurality of apertures 1244, such as discussed in FIG. 12A.

The roller can include a second layer 1258. In an embodiment, the second layer 1258 can include a breathable foam, such as when the roller 104 includes a vacuum roller. The breathable foam can allow the negative pressure differential or vacuum to transfer from within the roller to the outside surface, such as to temporarily adhere the masking material to the outer surface 110. In some embodiments, the breathable foam can be compressible, such as to cushion an impact with the glass unit when transferring the mask to the glass unit.

In an embodiment, the roller 104 can include a third layer 1260, such as a fabric. In an embodiment, the fabric can include stainless steel fabric. The fabric can be flexible, such that the fabric can be formed to the surface of the second layer 1258. In an embodiment, the fabric can include a mesh fabric, such as a stainless steel mesh fabric. The fabric can define small apertures, such as to allow a negative pressure differential or vacuum to temporarily adhere the masking material to the outer surface 110. In various embodiments, the third layer 1260 can include a stainless steel wire cloth. The stainless steel wire cloth can be corrosion resistant. The stainless steel wire cloth can include an 80×80 mesh size, such that the wires in the cloth define a grid of 80 apertures per inch (2.5 cm) in a vertical direction and 80 apertures per inch (2.5 cm) in a horizontal direction. In an embodiment, the wire can have a diameter of 0.007 inches (0.178 mm). In an embodiment, the wire can have a diameter of 0.0055 inches (0.140 mm). In various embodiments, the wire can have a diameter of at least 0.005 inches (0.127 mm). In various embodiments, the wire can have a diameter of 0.008 inches (0.203 mm) or less.

In various embodiments, the apertures can be at least 0.006 inches (0.152 mm). In various embodiments, the apertures can be at least 0.007 inches (0.178 mm). In some embodiments, the apertures can be at least 0.005 inches (0.127 mm) and 0.008 inches (0.203 mm) or less.

In an embodiment, the wire cloth can have 19% open area. In an embodiment, the wire cloth can have 31% open area. In an embodiment, the wire cloth can have 45% open area or less. In an embodiment, the wire cloth can have 40% open area or less. In an embodiment, the wire cloth can have 35% open area or less. In various embodiments, the wire cloth can have at least 19% open area and not more than 31% open area.

Figure 12C:
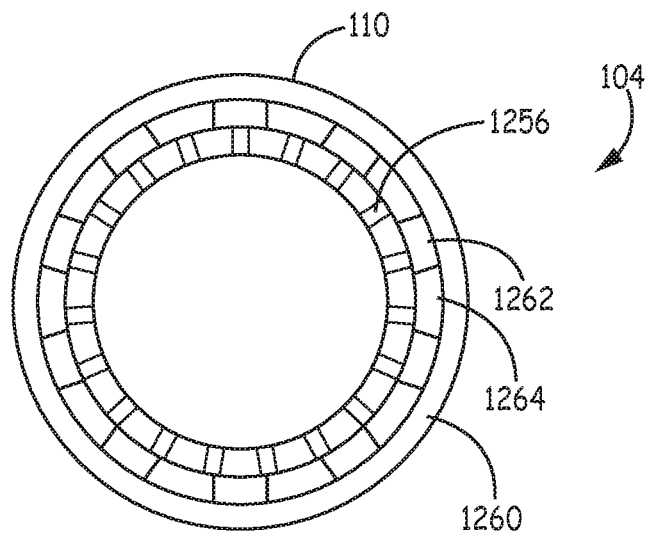
FIG. 12C is a cross-section of a roller, according to an embodiment.

FIG. 12C shows a cross section of a roller 104, according to an embodiment. In an embodiment, the roller 104 can include a first layer 1256, such as described in regards to FIG. 12B. In an embodiment, the roller 104 can include a second layer. The second layer can include one or more vertical strips 1262. In various embodiments, the vertical strips can be about ⅛ of an inch (3.18 mm) thick. In various embodiments, the vertical strips can be about ¼ of an inch (6.35 mm) wide. The vertical strips 1262 can include compressible foam, such as to cushion an impact with the glass unit when transferring the mask to the glass unit. The second layer can further include a plurality of gaps 1264. The gaps 1264 can be defined between subsequent vertical strips 1262. In an embodiment, the roller 104 can include a third layer 1260, such as described in regards to FIG. 12B.

Figure 13:
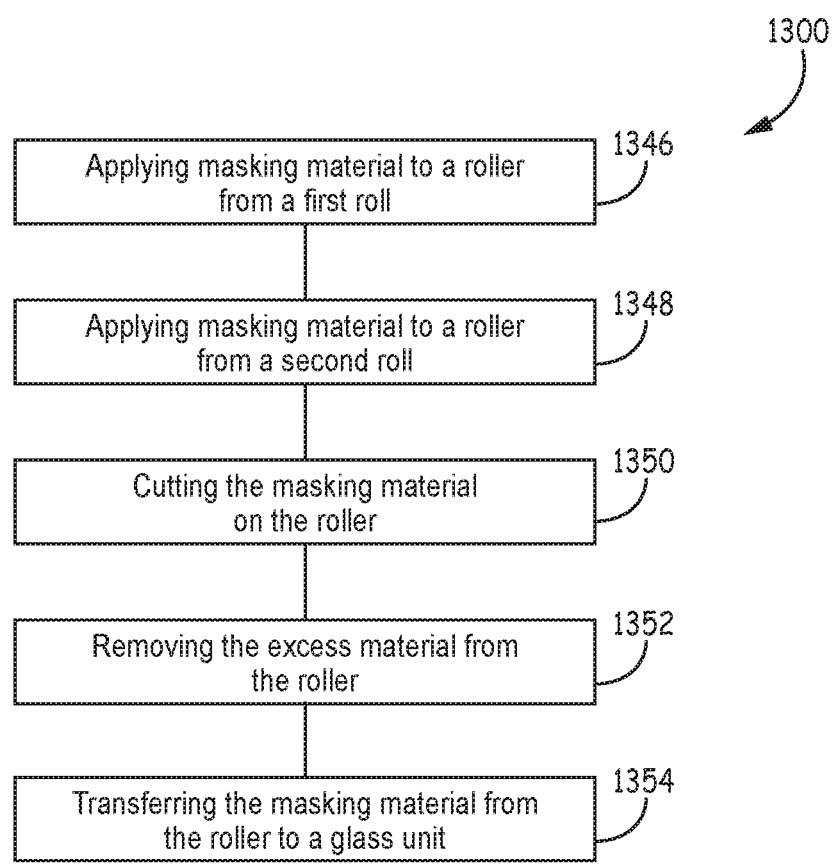
FIG. 13 is a schematic showing a method of applying a masking material to a glass unit.

FIG. 13 is a schematic showing a method 1300 of applying a masking material to a glass unit. In step 1346, the method 1300 can include applying a masking material to a roller, such as a vacuum roller, from a first roll of masking material. The masking material can be applied to an external surface of the roller.

The method 1300 can include step 1348. Step 1348 can include applying masking material to the roller from a second roll of masking material. The second roll of masking material can have a different height than the first roll of masking material, such as the second roller having a larger height than the first roll or the first roll having a larger height than the second roll.

The method 1300 can include step 1350. Step 1350 can include cutting the masking material on the roller. The masking material can be cut, such as to trim the masking material to the desired dimensions. The masking material can be cut, such as to account for necessary gaps in the mask such as for muntin bars that will be coupled to the exterior of the glass unit.

The method 1300 can include step 1352. Step 1352 can include removing the excess masking material or the waste masking material from the surface of the roller. When the masking material is cut or trimmed in step 1350, the masking material can be divided into desired masking material and waste masking material. The desired masking material can include the masking material that is to be applied to a surface of the glass unit. The waste masking material can be excess material that is not going to be applied to the glass unit. The waste masking material can be removed from the surface of the roller in order to avoid the waste masking material being applied to the glass unit. The waste masking material can be removed from the surface of the roller, such as with a vacuum element or a picking element.

The method 1300 can include step 1354. Step 1354 can include transferring the masking material from the surface of the roller to a surface of the glass unit. In an embodiment, the roller is moved into a position where the masking material on the roller touches the glass unit. The roller can be rotated at a rate consistent with the glass unit moving past the roller, or the roller moving past the glass unit, such that masking material is evenly applied to the glass unit.

In various embodiments, after the masking material is transferred to the glass unit from the roller, the roller can return to a location where the first roll of masking material applies masking material to the roller, such as step 1346, and the process of steps 1346, 1348, 1350, 1352, 1354 can be repeated, such as to apply masking material to subsequent glass units.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

The technology has been described with reference to various specific and preferred embodiments and techniques. However, it should be understood that many variations and modifications may be made while remaining within the spirit and scope of the technology.

The invention claimed is:

1. A system for applying a masking material to a planar substrate, comprising:
 a carousel configured to support a first roller and a second roller;
 a masking material application location where the system is configured to apply the masking material to a staging surface on the first roller or a staging surface on the second roller: and
 a transfer location where at least a portion of the masking material is transferred from the staging surface on the first roller or the staging surface on the second roller to a surface of a planar substrate: and
 wherein the carousel is configured to rotate around a carousel axis of the carousel to move the first roller between the masking material application location and the transfer location, wherein the carousel is further configured to rotate around the carousel axis to move the second roller between the masking material application location and the transfer location.

2. The system of claim 1, further comprising:
 a masking material cutting element configured to cut the masking material on the first or second roller so that the masking material applied to the first or second roller is cut to define a portion of the masking material as excess masking material and a remaining portion of the masking material as desired masking material, wherein the desired masking material is transferred to the surface of the planar substrate.

3. The system of claim 2, further comprising:
 a waste removal location configured to remove the excess masking material from the first or second roller.

4. The system of claim 3, further comprising:
 an excess material removal element configured to remove the excess masking material from the first or second roller at the waste removal location.

5. The system of claim 1, wherein the masking material application location comprises a first roll of masking material configured to apply masking material to the first or second roller.

6. The system of claim 1, wherein the masking material application location comprises a first roll of masking material and a second roll of masking material, separate from the first roll of masking material, wherein the first roll of masking material is configured to apply masking material to the first or second roller and the second roll of masking material is configured to apply masking material to the first or second roller.

7. The system of claim 1, wherein the masking material application location and the transfer location are located around the carousel axis.

8. The system of claim 2, wherein the masking material application location, the transfer location, and the cutting location are located around the carousel axis.

9. The system of claim 8, wherein the carousel is configured to rotate around the carousel axis to move the first roller from the masking material application location to the cutting location to the transfer location and back to the masking material application location.

10. The system of claim 2 wherein the masking material application location further comprises the masking material cutting element.

11. The system of claim 10 wherein the masking material application location further comprises an excess material removal element configured to remove the excess masking material from the first or second roller.

12. The system of claim 11 wherein the masking material application location comprises a first roll of masking material and a second roll of masking material, separate from the first roll of masking material, wherein the first roll of masking material is configured to apply masking material to the first or second roller and the second roll of masking material is configured to apply masking material to the first or second roller.

* * * * *